United States Patent [19]
Palmer

[11] Patent Number: 5,745,170
[45] Date of Patent: Apr. 28, 1998

[54] MOUNTING DEVICE FOR JOINING A NIGHT VISION DEVICE TO A SURVEILLANCE CAMERA

[75] Inventor: Gary L. Palmer, Vinton, Va.

[73] Assignee: ITT Corporation, New York, N.Y.

[21] Appl. No.: 548,341

[22] Filed: Nov. 1, 1995

[51] Int. Cl.[6] .................................................. H04N 5/225
[52] U.S. Cl. .......................... 348/217; 348/373; 348/375; 248/283.1; 362/191
[58] Field of Search ...................... 250/214 VT, 214 LA; 348/216, 217, 373, 375, 376, 335; 396/429, 529, 530, 533, 544; 248/283.1, 282.1, 289.11; 362/190, 191; H04N 5/225

[56] References Cited

U.S. PATENT DOCUMENTS

| | | | |
|---|---|---|---|
| 5,373,320 | 12/1994 | Johnson et al. | 348/217 |
| 5,444,507 | 8/1995 | Palmer | 354/82 |
| 5,483,379 | 1/1996 | Svanberg et al. | 359/634 |
| 5,564,817 | 10/1996 | Palmer | 362/191 |
| 5,625,853 | 4/1997 | Ihara | 396/419 |

*Primary Examiner*—Andrew Faile
*Assistant Examiner*—Ngoc-Yen Vu
*Attorney, Agent, or Firm*—Plevy & Associates

[57] ABSTRACT

An apparatus and associated method of coupling a night vision device to a CCD camera, thereby providing the CCD camera with low light capabilities. The apparatus includes a tubular adaptor element having a first end region and an opposite second end region. The first end region of the adaptor element is threaded and threads onto the objective lens assembly of the CCD camera, thereby joining the adaptor element to the CCD camera. The second end region of the adaptor element is not threaded, but rather is sized so that a segment of the ocular lens assembly of the night vision device can pass into the second end region. A bracket assembly extends from the adaptor element. The bracket attaches to the tripod mount on the night vision device, thereby providing support to the night vision device. As such, the bracket assembly retains the night vision device in a set orientation where the ocular lens assembly extends into the adaptor element and is optically aligned with the objective lens assembly of the CCD camera. Although the bracket assembly retains the night vision device so that the ocular lens assembly of the night vision device extends into the adaptor element, the ocular lens assembly is not physically joined to the adaptor element. Consequently, the night vision device can be held in optical alignment with the CCD camera regardless to the presence or absence of an attachment coupling on the ocular lens assembly.

14 Claims, 2 Drawing Sheets

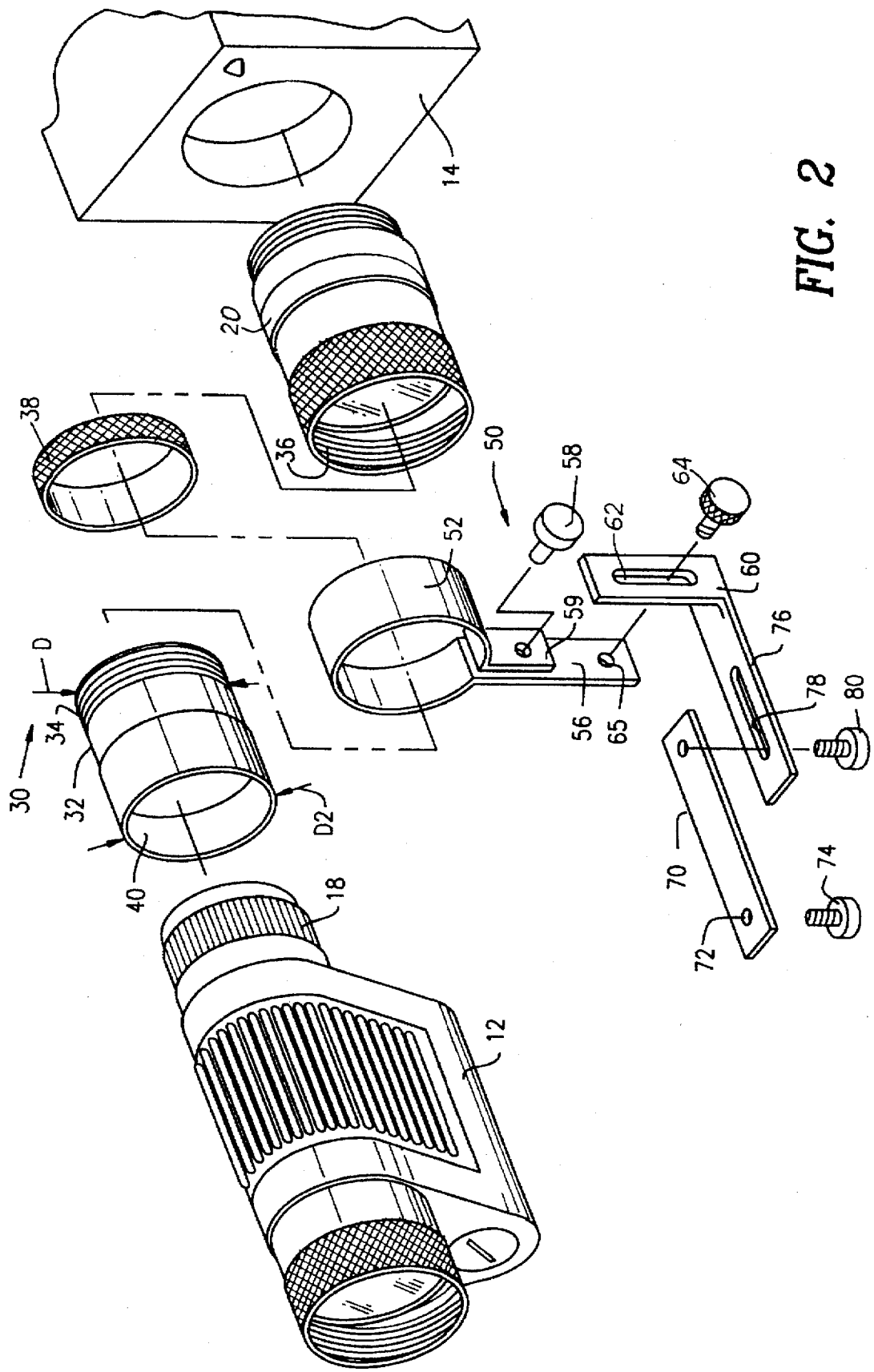

MOUNTING DEVICE FOR JOINING A NIGHT VISION DEVICE TO A SURVEILLANCE CAMERA

BACKGROUND OF THE INVENTION

I. Field of the Invention

The present invention relates to mounting assemblies that enable a night vision device to be joined to a CCD camera device such as a surveillance camera. More specifically, the present invention relates to a mounting assembly that joins a night vision device to a CCD camera without having to modify the optics of either the night vision device or the CCD camera.

II. Prior Art Statement

In the prior art record there are many night vision optical assemblies that enable a person to view a target object during night time or other low light conditions. Most such night vision assemblies are independent, self contained units having an objective lens assembly for receiving an low level light and an ocular lens assembly through which a person can directly view an intensified image. Since such night vision devices are independent units, they typically have either a focusable objective lens assembly and/or a focusable ocular lens assembly, so that a person using the night vision device can adjust the device to meet his/her needs. Furthermore, it is very common for such night vision devices to provide some degree of magnification to the image being viewed.

In addition to objective lens assemblies and ocular lens assemblies, night vision devices typically include an image intensifier tube, a battery source and various electronic components used control the image produced by the night vision device. As a result, night vision devices have significant mass that may exceed 1 kilogram for some models.

In order to use a close circular television (CCTV) surveillance camera at night or during low light conditions, night vision devices have been used in conjunction with the CCTV camera to produce an intensified image. In the prior art, there are many adaptor devices that are intended to join various night vision devices with various types of cameras. Such prior coupling devices are exemplified by U.S. Pat. No. 5,444,504 to Palmer, the inventor herein, entitled DEVICE FOR COUPLING NIGHT VISION ASSEMBLY TO A VIDEO CAMCORDER, which is assigned to ITT Corp., the assignee herein. When a night vision device is joined to the objective of a CCD camera, the resulting optical arrangement requires the CCD camera to rely solely upon the optics of the night vision device to properly focus the intensified image onto the charged coupled device within the camera. Often the optical design of the night vision device is incompatible with the optical design of the CCD camera objective lens assembly that it replaces. Consequently, the image received by the charged coupled device of the camera is adversely effected. This often results in either a very small image being recorded or an image of poor quality being recorded.

In attempt to rectify some of the optical disadvantages of substituting a night vision device in place of the objective lens assembly of a CCD camera, the prior art has often turned to the use of relay lens assemblies that join the night vision device to the CCD camera. An example of such a prior art system includes the use of the Model F6010 pocketscope night vision device manufactured by the Electro-Optical Products Division of ITT Corp., the assignee herein. The Model F6010 pocketscope is designed to be used with a custom made relay lens assembly. The relay lens assembly therein connects the Model F6010 pocketscope to a 35 mm SLR camera body where the relay lens assembly and Model F6010 pocketscope replace the objective lens normally used with the camera. The use of a relay lens does correct some of the optical design incompatibilities, however, relay lens assembly add significantly to both the cost and the complexity of the overall assembly.

CCTV surveillance cameras typically include objective lenses that are focusable to the area several feet in front of the camera. Often such objective lens assemblies cannot be focused to a point only one or two inches in front of the camera. As a result, relay lens systems are used in the prior art to help match the optics of the CCTV surveillance camera to the night vision device positioned only one or two inches in front of the surveillance camera. Many current relay lens systems for optically coupling night vision devices CCTV surveillance cameras involve the use of very costly customized lens systems. Such customized lens systems often require the user to disassemble the night vision device and remove the ocular lens assembly of the night vision device so that the relay lenses can focus directly upon the output surface of the image intensifier tube within the night vision device. Additionally, the customized relay lens assemblies are usually bulky in construction and are heavy due to the required hardware and many lenses.

There are many auxiliary lens that exist in the prior art for use with CCTV surveillance cameras. For example, there are wide angle lens assemblies, telescopic lens assemblies and close-up lens assemblies. Such lens assemblies are readily commercially available and are fairly inexpensive.

It is therefore an object of the present invention to provide a method and apparatus for joining a commercial night vision device to a CCTV surveillance camera using widely available auxiliary lens assemblies and without having to disassemble the night vision device.

It is a further object of the present invention to provide an attachment device for physically joining a night vision device to a CCTV surveillance camera, wherein the attachment device provides the physical support for the night vision device.

SUMMARY OF THE INVENTION

The present invention is an apparatus and associated method of coupling a night vision device to a CCD camera, thereby providing the CCD camera with low light capabilities. The present invention apparatus includes a tubular adaptor element having a first end region and an opposite second end region. The first end region of the adaptor element is threaded and threads onto the objective lens assembly of the CCD camera, thereby joining the adaptor element to the CCD camera. The second end region of the adaptor element is not threaded, but rather is sized so that a segment of the ocular lens assembly of the night vision device can pass into the second end region. A bracket assembly extends from the adaptor element. The bracket attaches to the tripod mount on the night vision device, thereby providing support to the night vision device. As such, the bracket assembly retains the night vision device in a set orientation where the ocular lens assembly extends into the adaptor element and is optically aligned with the objective lens assembly of the CCD camera. Although the bracket assembly retains the night vision device so that the ocular lens assembly of the night vision device extends into the adaptor element, the ocular lens assembly is not physically joined to the adaptor element. Consequently, the night vision device can be held in optical alignment with the CCD camera regardless to the presence or absence of an attachment coupling on the ocular lens assembly. Furthermore, in one embodiment of the present invention, the size of the bracket assembly can be varied so that most any commercially available night vision device with a tripod mount can be attached to the CCD camera, regardless of the size or type of its housing or ocular lens assembly.

BRIEF DESCRIPTION OF THE DRAWINGS

For a better understanding of the present invention, reference is made to the following description of an exemplary embodiment thereof, considered in conjunction with the accompanying drawings, in which:

FIG. 2 is an exploded perspective view of the preferred embodiment of the present invention device shown in FIG. 1.

DETAILED DESCRIPTION OF THE INVENTION

Figure 1:
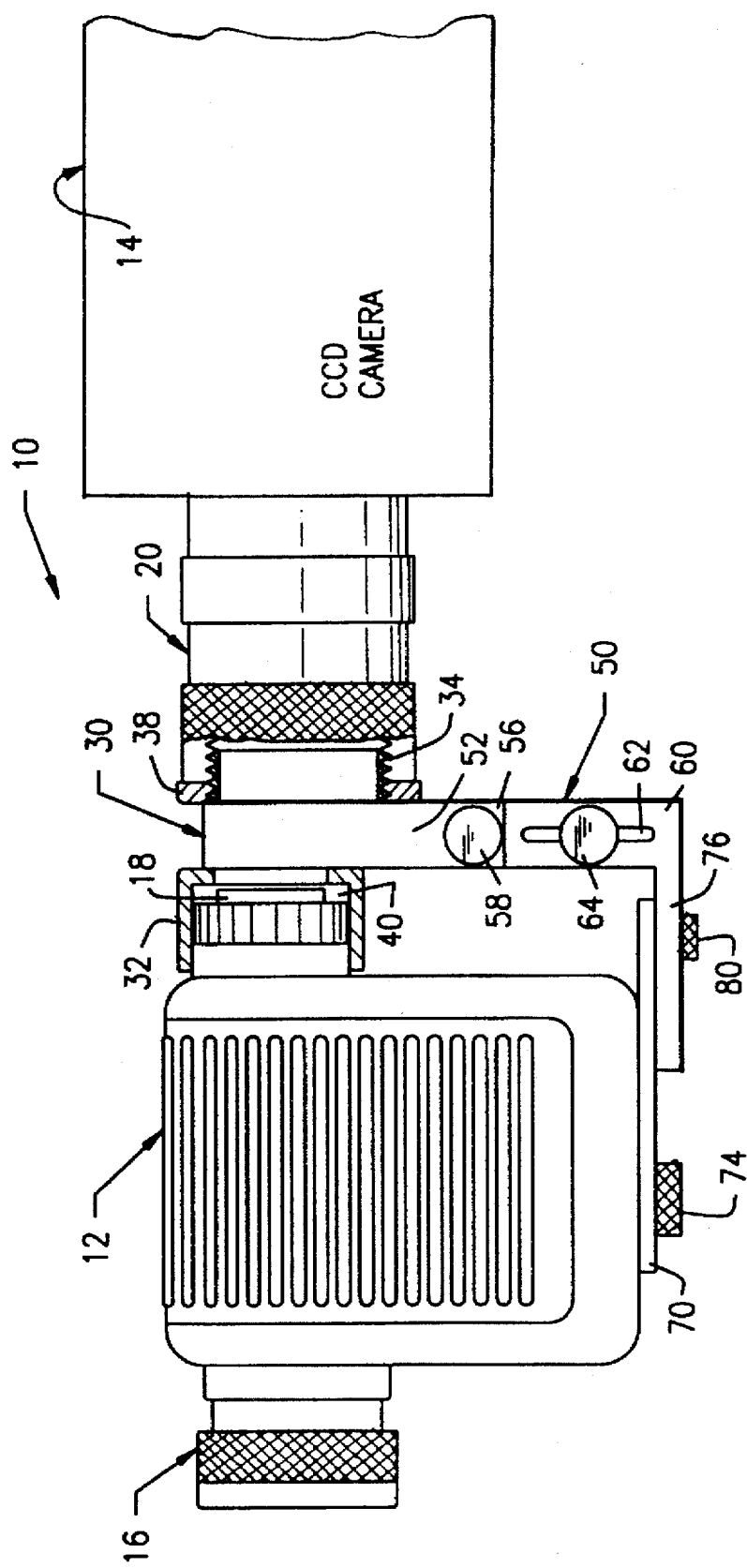
FIG. 1 is a selectively cross-sectional side view of one preferred embodiment of the present invention device.

Although the present invention can be used in many different applications where it is desirable to connect a night vision device to a CCD camera, the present invention is especially suitable for use in connecting a night vision device to a mounted CCTV surveillance camera. As such, the present invention will be described in connection with a CCTV surveillance camera in order to set forth the best mode contemplated for the invention.

Referring to FIG. 1, there is shown a completed assembly 10 wherein a night vision device 12 is connected to a CCTV surveillance camera 14. The night vision device 12 can be any commercially available night vision monocular device. However, in the preferred embodiment, the night vision device 12 is a FUTURESCOPE™ manufactured by ITT Corp., the assignee herein as described in U.S. patent application Ser. No. 08/405,172, entitled Compact Night Vision Device, which is herein incorporated by reference. The night vision device is a self-contained commercial unit that has a focusable objective lens assembly 16 and a focusable ocular lens assembly 18. Preferably the night vision device contains a Gen III image intensifier tube with a 25 mm output image.

A commercially available auxiliary lens assembly 20 is joined to the CCTV surveillance camera 14 in typical prior art fashion. The auxiliary lens assembly 20 can be any prior art lens assembly that is adapted to be directly coupled to the CCTV surveillance camera 14 and meets two functional criteria. Those functional criteria include the ability of the auxiliary lens assembly 20 to be focused at a near infinite conjugate and the ability of the auxiliary lens assembly to focus an image from an infinite conjugate onto the optical charged coupled device within the camera 14. CCTV surveillance cameras, like most commercially available CCD cameras, have chip mounted charge coupled devices that are ⅓ inch, ½ inch, ⅔ inch or 1 inch in size. Depending upon the size of the CCD chip within the CCTV surveillance camera 14, the auxiliary lens assembly 20 must be selected so that the auxiliary lens assembly 20, when focused at an infinite conjugate, reimages the incoming light at a size that corresponds to the CCD chip within that camera.

Night vision devices with focusable objective lens assemblies and ocular lens assemblies can typically be adjusted so that the image being viewed through the ocular lens assembly has no optical power. Such an optical condition is typically created by setting the ocular lens assembly of the night vision device at zero diopters. In the shown embodiment, the ocular lens assembly 18 can be adjusted to zero diopters. Furthermore, auxiliary lens assembly 20 can be focused generally at an infinite conjugate. Since the image passing through the ocular lens assembly 18 of the night vision device 12 has no optical power and the auxiliary lens assembly 20 is focusable at a generally infinite conjugate, by placing the night vision device 12 in front of the auxiliary lens assembly 20, the CCTV surveillance camera 14 would be able to directly image the output of the night vision device 12.

The ocular lens assemblies of most commercial night vision devices are intended to be viewed directly with the eye. As a result, not every night vision ocular lens assembly has threads or another coupling means that would enable the ocular lens assembly to be directly joined to another optical device. Furthermore, on night vision devices that do have an ocular lens coupling means, each night vision device has a coupling means of a different size that is intended for a different purpose. For example, some night vision devices have bayonet couplings that are adapted to be attached to a 35 mm camera. Other night vision devices are threaded and are adapted to be coupled to weapon sights. In both cases, the coupling device on the night vision device is different.

In the present invention, an adapter assembly 30 is provided that is capable of connecting most any commercial night vision monocular to a CCTV surveillance camera. Referring to FIG. 2 in conjunction with FIG. 1, it can be seen that the adapter assembly 30 includes a adaptor element 32 having a threaded neck region 34. The diameter D of the threaded neck region 34 as well as the thread size and pitch are sized to thread into the objective lens port 36 of the auxiliary lens assembly 20. Many commercially auxiliary lens assemblies for CCTV surveillance cameras typically provide a threaded objective lens port of 37 mm. As such, the threaded neck region 34 of the adaptor element 32 preferably has a thread diameter of 37 mm. The compatible sizing of the threaded objective lens port 36 of the auxiliary lens assembly 20 and the threaded neck region 34 of the adaptor element 32 enables the threaded neck region 34 to threadably engage the auxiliary lens assembly 20, thereby mechanically joining the adaptor element 32 to the auxiliary lens assembly 20. Many commercially lens assemblies have threaded objective lens ports 36 of different depths. As a result, when the adaptor element 32 is joined to the auxiliary lens assembly 20, the adaptor element 32 may be larger than the threaded objective lens port 36 and may become fully seated into the threaded objective lens port 36 prematurely. A knurled locking nut 38 is provided on the threaded neck region 34 of the adaptor element 32. The locking nut 38 can be tightened against the auxiliary lens assembly 20, after the auxiliary lens assembly 20 and adaptor element 32 are engaged, thereby locking the thread engagement in place.

The adaptor element 32 defines an open circular port 40 at the end opposite the threaded neck region 34. The circular port 40 is not threaded and defines an opening having a diameter D2 that is larger than the diameter of the exterior of the ocular lens assembly 18 on the night vision device 12. As such, when assembled, the circular port 40 of the adaptor element 32 passes over and partially envelops the ocular lens assembly 18 of the night vision device 12. However, no direct mechanical interconnection exists between the adaptor element 32 and ocular lens assembly 12 of the night vision device 12.

The adaptor element 32 of the adaptor assembly 30 is indirectly connected to the night vision device 12 via a bracket assembly 50. In the shown embodiment, a clamping structure 52 extends around the adaptor element 32. The clamping structure 52 is disposed in a groove on the exterior of the adaptor element 32, thereby preventing the clamping structure 52 from being removed from the adaptor element 32. However, the clamping structure 52 is not affixed to the adaptor element 32. As such, the adaptor element 32 is capable of rotating about its own longitudinal axis within the clamping structure 52. A vertical element 56 extends downwardly from the clamping structure 52. A tightening knob 58 is provided that joins the free end 59 of the clamping structure 52 to the vertical element 56. The tightening knob 58 enables the clamping structure 52 to be tightened around the exterior of the adaptor element 32, thereby engaging the adaptor element 32 with and interference fit and preventing the adaptor element 32 from moving independently of the clamping structure 52 and vertical element 56.

The use of the clamping structure 52 in the adaptor assembly 30 enables the adaptor element 32 to be rotated and joined to the auxiliary lens assembly 20 without having to rotate the entire bracket assembly 50 and any night vision device that may be coupled to the bracket assembly 50. However, it should be understood that in an alternate embodiment no clamping structure 52 need be used and the bracket assembly 50 can be rigidly affixed to a set position on the adaptor element 32.

In the shown embodiment, the bracket assembly 50 is an adjustable assembly that can be adjusted both horizontally and vertically. The purpose of the adjustability is to enable the bracket assembly 50 to be coupled to a variety of commercial night vision devices that all vary in shape and size. However, it should be understood that the bracket assembly 50 need not be adjustable, but rather could be a static rigid member if used to join one particular night vision device to a surveillance camera.

In FIG. 1 and FIG. 2, it can be seen that on the bracket assembly 50, an L-shaped corner bracket member 60 is coupled to the vertical element 56. A slot 62 is formed in the vertical arm 62 of the corner bracket member 60. A second tightening screw 64 extends through the slot 62 and engages a threaded bore 65 (FIG. 2) on the vertical element 56. As such, by selectively tightening and loosening the tightening screw 64, the vertical element 56 and the corner bracket member 60 can be joined together at any point across the range of the slot 62. As a result, the vertical height of the overall bracket assembly 50 can be varied by a distance proportional to the length of the slot 62.

A base support element 70 is provided through which a hole 72 (FIG. 2) is disposed. A mounting screw 74 passes through the hole 72, wherein the mounting screw 74 is sized to engage the tripod mounting hole (not shown) present on the bottom of many commercial night vision devices. As such, the bottom of the night vision device 12 can be rigidly coupled to base support element 70, via the mounting screw 74. The base support element 70 also joins to the horizontal arm 76 of the corner bracket member 60. A slot 78 (FIG. 2) is formed in the horizontal arm 76 of the corner bracket member 60. A third tightening screw 80 extends through the slot 78 and engages a threaded bore 79 on the base support element 70. As such, by selectively tightening and loosening the third tightening screw 80, the base support element 70 and the corner bracket member 60 can be joined together at any point across the range of the slot 78. As a result, the length L of the overall bracket assembly so can be varied by a length proportioned to the length of the slot 78.

When fully assembled, the adaptor assembly 30 rigidly couples the bottom of the night vision device to the auxiliary lens assembly 20 of the CCTV surveillance camera 14. Using the adaptor assembly 30 shown, the ocular lens assembly 18 is rigidly supported in optical alignment with the auxiliary lens assembly 20, regardless to what type of coupling means may or may not be disposed on the night vision ocular lens assembly 18. Furthermore, given the optional ability of the adaptor assembly 30 to be adjusted for length and height, almost every commercially available night vision monocular device.

It will be understood that the adaptor assembly, as well as the overall night vision/camera assembly, described herein are merely exemplary and that a person skilled in the art may make variations and modifications to the described embodiments utilizing functionally equivalent components to those described. All such variations and modifications are intended to be included within the scope of this invention as defined by the appended claims.

What is claimed is:

1. A mounting apparatus for joining a night vision device to a camera containing a charged coupled device, wherein the night vision device has an ocular lens assembly and the camera has an objective lens assembly, said apparatus comprising:

an adaptor element having a first end region and a second end region that are coaxially aligned along a longitudinal axis, wherein said first end region is threaded and sized to engage the objective lens assembly of the camera, and said second end region is sized to receive and envelop at least a portion the ocular lens assembly of the night vision device therein, without mechanically joining with the ocular lens assembly;

a bracket assembly extending from said adaptor element, said bracket assembly having an attachment means thereon for attaching said bracket assembly to the night vision device, wherein said bracket assembly rigidly affixes the night vision device to said adaptor element at an orientation where the ocular lens assembly is substantially optically aligned with the objective lens assembly of the camera through the adaptor element.

2. The apparatus according to claim 1, wherein said adaptor element is independently rotatable around said longitudinal axis relative to said bracket assembly.

3. The apparatus according to claim 2, wherein said bracket assembly includes a clamp structure that engages said adaptor element and a means for selectively tightening and loosening said clamp structure, thereby selectively controlling the ability of said adaptor element to rotate about its longitudinal axis.

4. The apparatus according to claim 1, wherein said bracket assembly includes a vertical element that radially extends a first predetermined distance from said adaptor element at a perpendicular to said longitudinal axis and a horizontal element that extends a second predetermined distance from said vertical element parallel to said longitudinal axis.

5. The apparatus according to claim 4, wherein said attachment means is disposed on said horizontal element and said horizontal element is adjustable, thereby enabling said second predetermined distance to be selectively varied.

6. The apparatus according to claim 5, wherein said vertical element is adjustable, thereby enabling said first predetermined distance to be selectively varied.

7. The apparatus according to claim 1, further including a locking nut disposed on said first end region.

8. A night vision camera assembly, comprising:

a CCD camera having an auxiliary objective lens assembly coupled thereto;

a night vision device having an ocular lens assembly;

a mounting apparatus for joining said night vision device to said camera, said mouting apparatus having an adaptor element and a bracket assembly affixed to said adaptor element, said adaptor element coupled to said auxiliary objective lens assembly of said camera, said ocular lens assembly of said night vision device extending into said adaptor element, and said bracket assembly supporting said night vision device at a set orientation;

wherein said mounting apparatus optically aligns said ocular lens assembly of said night vision device with said auxiliary objective lens assembly of said camera.

9. The night vision camera assembly according to claim 8, wherein said ocular lens assembly is essentially afocal and said auxiliary objective lens assembly is focused at a substantially infinite conjugate.

10. The night vision camera assembly according to claim 8, wherein said ocular lens assembly is not mechanically joined to said adaptor element.

11. The night vision camera assembly according to claim 8, wherein said night vision device is an independent unit capable of functioning independently of said CCD camera.

12. The night vision camera assembly according to claim 8, wherein said bracket assembly is adjustable, thereby enabling said night vision device to be moved in position relative to said adaptor element.

13. A method of joining a night vision device to a camera device, wherein the night vision device includes a tripod mount and an ocular lens assembly, said method comprising the steps of:

providing a mounting apparatus having a tubular adaptor and a bracket extending therefrom;

coupling an auxiliary lens assembly to said camera device, wherein said auxiliary lens assembly is capable of being focused at a substantially infinite conjugate;

coupling said tubular adaptor to said auxiliary lens assembly;

mounting said bracket to said night vision device at said tripod mount, wherein said bracket supports the ocular lens assembly of said night vision device in optical alignment with said auxiliary lens assembly.

14. The method according to claim 13, wherein said ocular lens assembly of said night vision device extends into said tubular adaptor without being coupled to said tubular adaptor, when supported by said bracket.

* * * * *